(12) United States Patent
Kim et al.

(10) Patent No.: US 8,730,889 B2
(45) Date of Patent: May 20, 2014

(54) METHOD OR HARQ ACKNOWLEDGEMENT TRANSMISSION AND TRANSPORT BLOCK RETRANSMISSION IN A WIRELESS COMMUNICATION SYSTEM

(75) Inventors: Ki Hwan Kim, Gyeonggi-do (KR); Jae Hoon Chung, Gyeonggi-do (KR); Yeong Hyeon Kwon, Gyeonggi-do (KR); Seung Hee Han, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 143 days.

(21) Appl. No.: 13/126,896

(22) PCT Filed: Oct. 14, 2009

(86) PCT No.: PCT/KR2009/005896
§ 371 (c)(1),
(2), (4) Date: Apr. 29, 2011

(87) PCT Pub. No.: WO2010/050688
PCT Pub. Date: May 6, 2010

(65) Prior Publication Data
US 2011/0205996 A1    Aug. 25, 2011

Related U.S. Application Data

(60) Provisional application No. 61/109,900, filed on Oct. 30, 2008, provisional application No. 61/109,901, filed on Oct. 30, 2008, provisional application No. 61/111,728, filed on Nov. 6, 2008, provisional application No. 61/111,727, filed on Nov. 6, 2008, provisional application No. 61/153,972, filed on Feb. 20, 2009.

(30) Foreign Application Priority Data

Aug. 18, 2009 (KR) .................. 10-2009-0076133

(51) Int. Cl.
*H04W 4/00* (2009.01)
*H04W 72/12* (2009.01)
*H04L 5/00* (2006.01)

(52) U.S. Cl.
CPC ......... *H04W 72/1289* (2013.01); *H04L 5/0055* (2013.01); *H04L 5/0073* (2013.01)
USPC ............ 370/329; 370/431; 370/449; 370/476

(58) Field of Classification Search
CPC ... H04L 5/0055; H04L 5/0073; H04W 28/26; H04W 72/1263; H04W 72/04; H04B 7/0417
See application file for complete search history.

(56) References Cited

U.S. PATENT DOCUMENTS

2005/0201325 A1* 9/2005 Kang et al. .................... 370/328
2007/0113138 A1   5/2007 Kwon et al.

(Continued)

FOREIGN PATENT DOCUMENTS

WO          03/069824 A2    8/2003
WO          2007/078142     7/2007

(Continued)

*Primary Examiner* — Andrew Chriss
*Assistant Examiner* — Salvador E Rivas
(74) *Attorney, Agent, or Firm* — Morgan, Lewis & Bockius LLP

(57) ABSTRACT

A method of transport block retransmission in a wireless communication system employing carrier aggregation is disclosed. A method of retransmitting transport blocks in a base station of a wireless communication system employing carrier aggregation comprises mapping each of a plurality of transport blocks to each of a plurality of component carriers using a first mapping pattern and transmitting the plurality of transport blocks to a mobile station; recognizing that the plurality of transport blocks are not transmitted successfully; and mapping each of the plurality of transport blocks to each of the plurality of component carriers using a second mapping pattern and retransmitting the plurality of transport blocks to the mobile station.

6 Claims, 10 Drawing Sheets

| Indicator | HARQ acknowledgements |
|---|---|

(56) References Cited

U.S. PATENT DOCUMENTS

| | | | |
|---|---|---|---|
| 2008/0052591 A1* | 2/2008 | Terry et al. | 714/748 |
| 2008/0086669 A1* | 4/2008 | Cheng et al. | 714/748 |
| 2008/0159323 A1* | 7/2008 | Rinne et al. | 370/431 |
| 2008/0225788 A1* | 9/2008 | Inoue et al. | 370/329 |
| 2008/0298322 A1 | 12/2008 | Chun et al. | |
| 2008/0317017 A1* | 12/2008 | Wiemann et al. | 370/389 |
| 2009/0305698 A1* | 12/2009 | Zhang et al. | 455/434 |
| 2010/0005351 A1 | 1/2010 | Ahn et al. | |
| 2010/0027697 A1* | 2/2010 | Malladi et al. | 375/260 |
| 2010/0034152 A1* | 2/2010 | Imamura | 370/329 |
| 2010/0098012 A1* | 4/2010 | Bala et al. | 370/329 |
| 2010/0227569 A1* | 9/2010 | Bala et al. | 455/73 |

FOREIGN PATENT DOCUMENTS

| | | | | |
|---|---|---|---|---|
| WO | 2007/148945 A2 | 12/2007 | | |
| WO | WO2008058112 | * | 5/2008 | H04B 7/06 |

* cited by examiner

Fig. 14
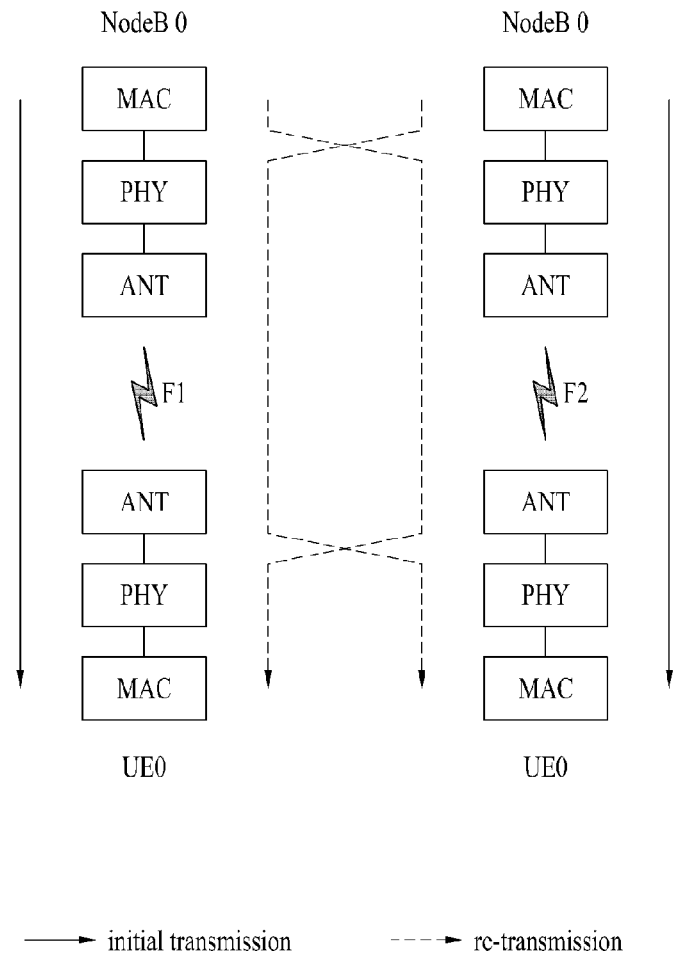
Fig. 15
| Indicator | HARQ acknowledgements |
Fig. 16
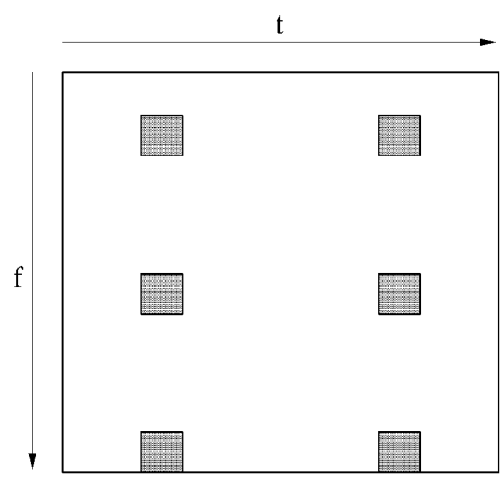

METHOD OR HARQ ACKNOWLEDGEMENT TRANSMISSION AND TRANSPORT BLOCK RETRANSMISSION IN A WIRELESS COMMUNICATION SYSTEM

The present application is a national stage of PCT International Application No. PCT/KR2009/005896, filed Oct. 14, 2009, and claims the benefit of U.S. Provisional Application Nos. 61/109,900, filed Oct. 30, 2008, 61/109,901, filed Oct. 30, 2008, 61/111,728, filed Nov. 6, 2008, 61/111,727, filed Nov. 6, 2008, and 61/153,972, filed Feb. 20, 2009. The present national stage application also claims the benefit of Korean Patent Application No. 10-2009-0076133, filed Aug. 18, 2009.

TECHNICAL FIELD

The present invention relates to a wireless communication system, and more particularly to a method of HARQ acknowledgement transmission and transport block retransmission in a wireless communication system with carrier aggregation.

BACKGROUND ART

A LTE-A (Long Term Evolution Advanced) system aggregates five 20 MHz bandwidths and supports 100 MHz through carrier aggregation, wherein standardization of the LTE-A system is going on. Carrier aggregation is a technology that aggregates a plurality of carriers and expands bandwidth to increase data rate.

A multi carrier is a whole frequency band a base station uses, and a component carrier is element carrier included in a multi carrier. That is, a plurality of component carriers composes a multi carrier through carrier aggregation.

Hybrid automatic repeat request (HARQ) will be described.

HARQ is a method combining forward error correction, (FEC) and automatic repeat request (ARQ), wherein the HARQ is used to improve transmission efficiency of packet data which is less sensitive to transmission delay. HARQ is used as connected to a physical layer, and improves decoding success rate by combining retransmitted data with data received previously. That is, according to HARQ, a receiver does not discard a failed packet but store it, and decodes it by combining it with a retransmitted packet.

According to HARQ, after transmitting a transmission block to a receiver, a transmitter receives an acknowledgement (ACK) or a Negative Acknowledgement (NACK). If receiving a NACK, a transmitter retransmits a transmission block.

FIG. 1 illustrates HARQ scheme according to the related art in a wireless communication system with carrier aggregation.

Illustrated in FIG. 1, a base station transmits data to a mobile station through a physical downlink control channel (PDCCH) and a physical downlink shared channel (PDSCH) of F1 and F2 carriers. Then if a base station receives a NACK or a timer of a base station is expired, a base station retransmits data through same frequency band. That is, data which is transmitted through F1 carrier in initial transmission is transmitted through F1 carrier in retransmission, and data which is transmitted through F2 carrier in initial transmission is transmitted through F2 carrier in retransmission.

However, if a carrier which is used in initial transmission is used in retransmission, it is difficult that data which is transmitted through a carrier with low quality in initial transmission is transmitted successfully in retransmission.

FIG. 2 illustrates a method of HARQ acknowledgement transmission according to the related art in a wireless communication system with carrier aggregation.

A base station transmits control information through PDCCHs of F1, F2 and F3 carriers and downlink data through PDSCHs of F1, F2 and F3 carriers to a mobile station. A mobile station, which receives downlink signal from a base station, transmits ACK/NACK for the downlink signal to a base station through an assigned F4 carrier. At this time, a mobile station transmits ACK/NACK through a physical uplink control channel (PUCCH) or a physical uplink shared channel (PUSCH).

According to another related art, a base station transmits data through one PDSCH and one PDCCH and a mobile station transmits ACK/NACK for the data received through one PDSCH and one PDCCH through one PUSCH and one PUCCH. That is, one downlink carrier is mapped to one uplink carrier.

But, because of carrier aggregation, ACK/NACK for data transmitted through a plurality of downlink carriers need to be transmitted through one uplink carrier. However, in case that one PUCCH can carry ACK/NACK for data received through one carrier, if a mobile station transmits ACK/NACK for data received through carriers whose number is more than the number of PUCCH, quality of uplink control information is depreciated or amount of control information transmitted is reduced. And, in case that ACK/NACK is transmitted through a PUSCH, quality of data transmitted through the PUSCH is depreciated.

DISCLOSURE OF INVENTION

Technical Problem

As previously stated above, the related art has a problem that it is difficult that data which is transmitted through a carrier with low quality in initial transmission is transmitted successfully in retransmission since a carrier which is used in initial transmission is used in retransmission. And the related art also has a problem that quality of control information or data transmitted through a PUCCH or a PUSCH is depreciated since ACK/NACK is transmitted through the PUCCH or the PUSCH.

An object of the present invention is to provide a method of transport block retransmission, which improves quality of data decoding.

Another object of the present invention is to provide a method of HARQ acknowledgement transmission, which does not depreciate quality of a PUCCH or a PUSCH.

Technical subject matters to be realized by embodiments of the present invention are not limited to the above-mentioned technical subject matters, and other technical subject matters not mentioned in the above-mentioned description may be easily appreciated by those skilled in the art to which the present invention pertains without difficulty.

Technical Solution

In order to solve the above technical problems, a method of retransmitting transport blocks in a base station of a wireless communication system employing carrier aggregation comprises mapping each of a plurality of transport blocks to each of a plurality of component carriers using a first mapping pattern and transmitting the plurality of transport blocks to a mobile station; recognizing that the plurality of transport blocks are not transmitted successfully; and mapping each of the plurality of transport blocks to each of the plurality of component carriers using a second mapping pattern and retransmitting the plurality of transport blocks to the mobile station.

Also, the first mapping pattern is different from the second mapping pattern.

In this case, the second mapping pattern is a pattern generated by cyclic-shifting the first mapping pattern by a specific component carrier number.

Also, the step of retransmitting includes transmitting control information for each of the plurality of transport blocks to the mobile station, the control information including a HARQ (Hybrid automatic repeat request) swap indicator which indicates a different mapping pattern is used from the first mapping pattern.

Also, the control information includes a carrier selection bit indicating which component carrier a transmission block is transmitted through.

Also, the step of transmitting includes mapping two or more transport blocks to each of the plurality of component carriers using a third mapping pattern and the step of retransmitting includes mapping the two or more transport blocks to each of the plurality of component carriers using the third mapping pattern.

Also, the step of transmitting includes mapping two or more transport blocks to each of the plurality of component carriers using a third mapping pattern and the step of retransmitting includes mapping the two or more transport blocks to each of the plurality of component carriers using a forth mapping pattern.

Also, the step of recognizing includes recognizing that the plurality of transport blocks is not transmitted successfully by receiving negative acknowledgement (NACK).

Also, the step of recognizing includes recognizing that the plurality of transport blocks is not transmitted successfully by expiring a timer without receiving acknowledgement (ACK), wherein the timer is started immediately after transmitting the plurality of transport blocks.

In another aspect of the present invention, a method of transmitting HARQ acknowledgement in a receiver of a wireless communication system employing carrier aggregation comprises receiving data through a plurality of component carriers from a transmitter; and transmitting, a uplink control channel, a plurality of HARQ acknowledgements for the data to the transmitter.

In this case, the uplink control channel includes an indicator indicating that the uplink control channel carries the plurality of HARQ acknowledgements.

Also, the uplink control channel carries only the plurality of HARQ acknowledgements and the plurality of HARQ acknowledgements are masked or scrambled with a specific sequence which represents that the uplink control channel carries only the plurality of HARQ acknowledgements.

Also, the uplink control channel carries only the plurality of HARQ acknowledgements and the uplink control channel is configured to a predetermined format which represents that the uplink control channel carries only the plurality of HARQ acknowledgements.

In other aspect of the present invention, a method of transmitting HARQ acknowledgement in a receiver of a wireless communication system employing carrier aggregation comprises receiving data through a plurality of component carriers from a transmitter; and transmitting a uplink control channel in which a plurality of HARQ acknowledgements for the data are mapped discontinuously to resource elements of SC-FDMA symbols just beside reference signals.

Advantageous Effects

According to the embodiments of the present invention, the following advantages can be obtained.

First of all, since a component carrier which is different from a component carrier used in initial transmission is used in transport block retransmission, quality of data decoding is improved.

Second, since an uplink control channel carries only HARQ acknowledgements, depreciation of quality of an uplink control channel can be prevented.

Third, since HARQ acknowledgements are distributed discontinuously in resource, performance of code block can be improved.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 8 illustrates second retransmission of transport blocks in case that a HARQ swap indicator is on.

FIG. 14 illustrates another example of operation of coding chain and decoding chain according to an embodiment of the present invention.

FIG. 15 illustrates configuration of an uplink control channel including HARQ acknowledgement according to an embodiment of the present invention.

FIG. 16 illustrates configuration of an uplink data channel in case that HARQ acknowledgement is transmitted through an uplink data channel.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings. For convenience of description and better understanding of the present invention, some parts unrelated to the inventive concept of the present invention will be omitted herein. Wherever possible, the same reference numbers will be used throughout the drawings to refer to the same or like parts.

In the whole part of the specification of the present invention, if it is assumed that a certain part includes a certain component, the term 'including' means that a corresponding component may further include other components unless a specific meaning opposed to the corresponding component is written. In addition, another term '. . . part', '. . . unit', 'module' or the like means a unit for processing at least one function or operation, and this unit may be implemented by hardware, software, or a combination thereof.

First, a method of transport block retransmission according to an embodiment of the present invention will hereinafter be described with reference to FIGS. 3 to 12.

Figure 1:
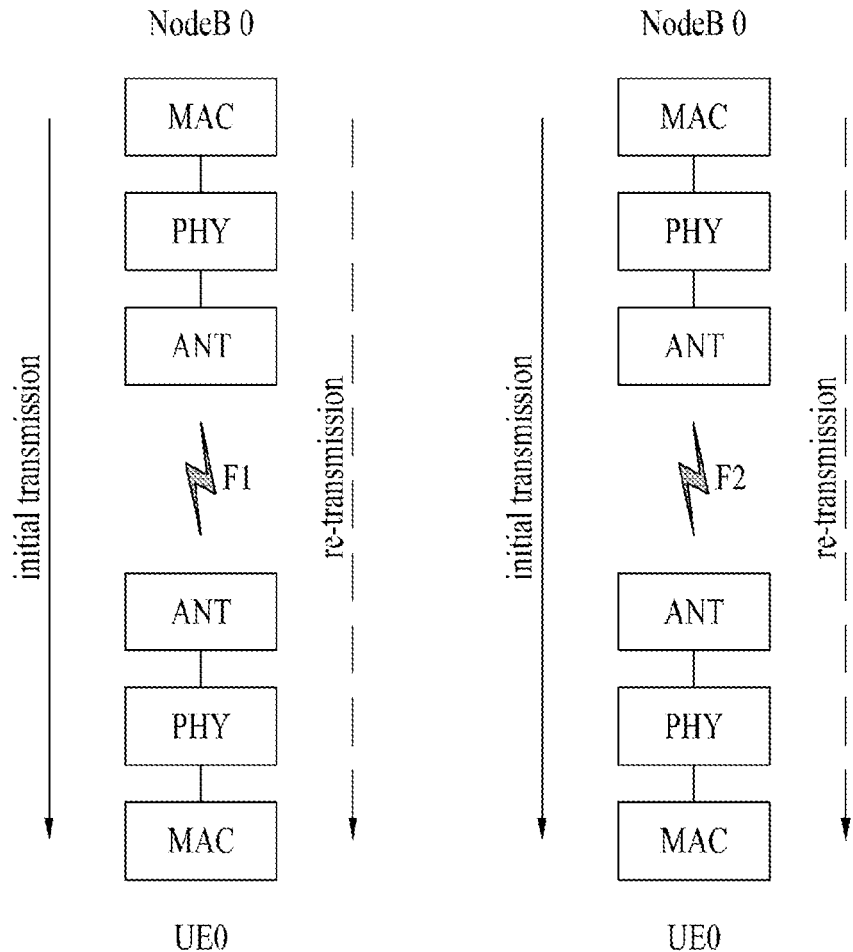
FIG. 1 illustrates HARQ scheme according to the related art in a wireless communication system employing carrier aggregation.
Figure 2:
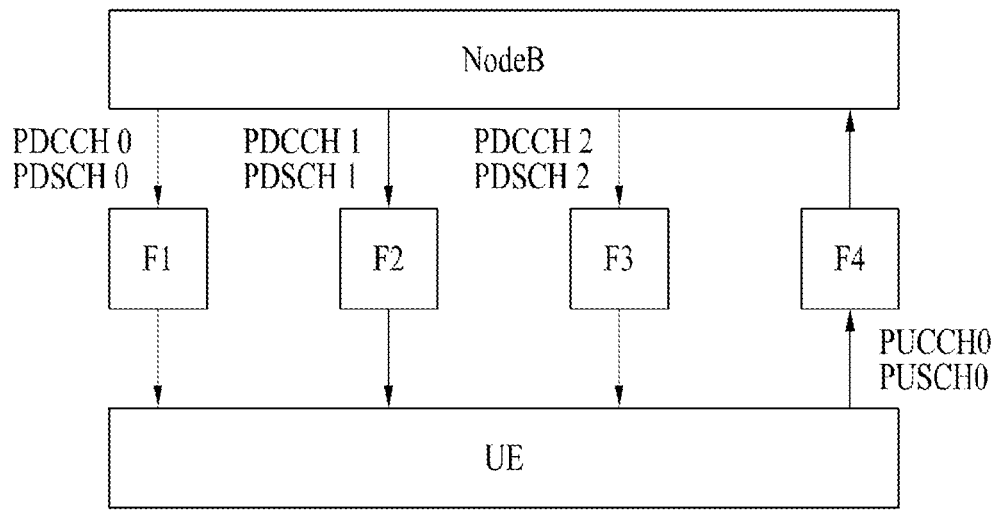
FIG. 2 illustrates a method of HARQ acknowledgement transmission according to the related art in a wireless communication system employing carrier aggregation.
Figure 3:
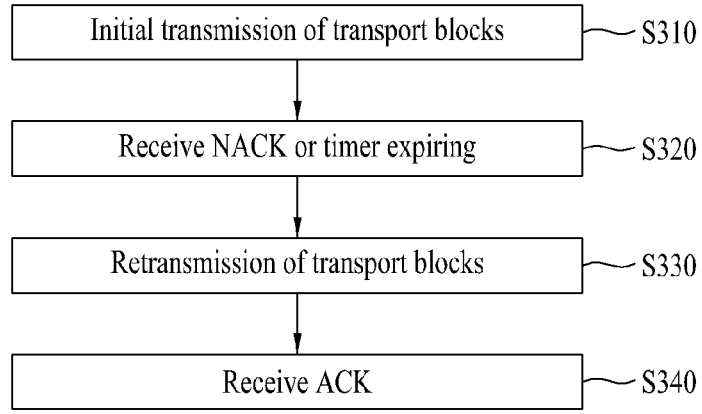
FIG. 3 is a flowchart which illustrates a method of transport block retransmission according to an embodiment of the present.
Figure 4:
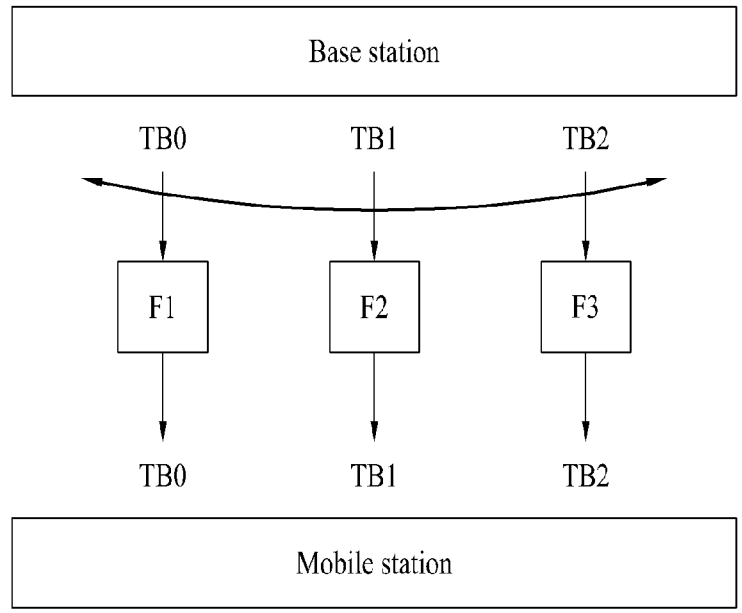
FIG. 4 illustrates a process that a plurality of transmission blocks is transmitted through a plurality of component carriers.

FIG. 3 is a flowchart which illustrates a method of transport block retransmission according to an embodiment of the present and FIG. 4 illustrates a process that a plurality of transmission blocks is transmitted through a plurality of component carriers.

As illustrated in FIG. 3, a base station transmits transport blocks initially to a mobile station S310.

In FIG. 4, each of TB0, TB1 and TB2 represents a transport block and each of F1, F2 and F3 represents a component carrier. In FIG. 4, a mobile station can transmit and receive data through a plurality of component carriers simultaneously, and a component carrier is mapped to a transport block and a HARQ entity.

FIG. 4 represents a case that three component carriers are used. But, a number of used component carriers can be various and a number of transport blocks and HARQ entities mapped to a component carrier depend on a transmission scheme (SISO, MIMO). A number of transport blocks mapped to a component carrier and a number of HARQ entities mapped to a component carrier are the same. For example, that two transport blocks mapped to a component carrier means that a base station transmits two transport blocks through a component carrier in a transmission time interval (TTI) and there are two HARQ entities in a component carrier.

In FIG. 4, TB0 is transmitted through F1, TB1 is transmitted through F2, and TB2 is transmitted through F3.

At this time, control information of each of transport blocks is transmitted through a PDCCH, and data of each of transport blocks is transmitted through a PDSCH. For example, control information for recovery of TB0 is transmitted through the PDCCH 0 of F1. The control information for recovery of TB0 indicates that TB0 is new data. Data of TB0 is transmitted through the PDSCH 0 of F1.

A base station recognizes that a mobile station does not receive a plurality of transport blocks successfully if receiving a negative acknowledgement (NACK) or not receiving an acknowledgement (ACK) until a timer, which is started immediately after a plurality of transport blocks is transmitted, is expiring S320.

ACKs for downlink data are transmitted by a unit of downlink carriers. For example, when a base station transmits TB0, TB1 and TB2 initially, if an error occurs only in TB1, a NACK for TB0, TB1 and TB2 can be transmitted.

Then, a base station retransmits a plurality of transport blocks S330.

A base station retransmits each of a plurality of transport blocks through a component carrier which is different from a component used in initial transmission. At this time, if a base station maps each of a plurality of transport blocks to each of a plurality of component carriers using a first mapping pattern in initial transmission, a base station can maps a plurality of transport blocks to each of a plurality of component carriers using a second mapping pattern in retransmission, wherein the second mapping pattern is a pattern generated by cyclic-shifting the first mapping pattern by a specific component carrier number. For example, if a mapping pattern of FIG. 4 is cyclic-shifted to the left by a component carrier number, TB0 is transmitted through F1 in initial transmission and transmitted through F3 in retransmission. TB1 is retransmitted through F1 and TB2 is retransmitted through F2. In an embodiment of the present invention, it is referred to HARQ swap that each of a plurality of transport blocks is transmitted through a component carrier which is different from a component used in initial transmission.

As described above, if a mapping pattern, which is a pattern generated by cyclic-shifting the first mapping pattern to the left by a component carrier number, is used in retransmission, TB0 transmitted through F1 in initial transmission is retransmitted through F3.

At this time, data of retransmitted TB0 is transmitted through the PDSCH 2 of F3.

And, control information of retransmitted TB0 can be transmitted through the PDCCH 2 of F3, the PDCCH 0 of F1 or the PDCCH of primary carrier which a base station predefined for a mobile station. The control information of retransmitted TB0 represents that TB0 is retransmitted.

When retransmitting transport blocks, a base station informs a mobile station whether HARQ swap occurs or not.

A base station can inform a mobile station that HARQ swap occurs by adding an HARQ swap indicator to control information of each of transport blocks. At this time, a base station can newly define a HARQ swap indicator or use a transport block to codeword swap flag included in the previous PDCCH.

For example, a base station can use a transport block to codeword swap flag for indicating codeword swap in a legacy system such as a LTE system and for indicating HARQ swap in a new system such as a LTE-A system. Or, a base station can use a transport block to codeword swap flag for indicating codeword swap in a legacy system such as a LTE system and for indicating codeword swap and HARQ swap in a new system such as a LTE-A system.

In case that a number of component carriers is 2, a base station inform a mobile station only whether HARQ swap occur or not as a HARQ swap indicator. For example, in initial transmission, a base station turns off a HARQ swap indicator and transmits $0^{th}$ transport block through $0^{th}$ component carrier and transmits $1^{th}$ transport block through $1^{th}$ component carrier. And in retransmission, a base station turns on a HARQ swap indicator and transmits $0^{th}$ transport block through $1^{th}$ component carrier and transmits $1^{th}$ transport block through $0^{th}$ component carrier.

Figure 5:
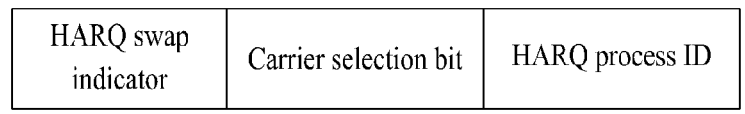
FIG. 5 represents an example of information included in PDCCH according to an embodiment of the present invention.

In case that a number of component carriers is over 3, not only a HARQ swap indicator but also a carrier selection bit is need, wherein the carrier selection bit indicates a component carrier which a specific transport block is transmitted through. FIG. 5 represents an example of information included in a PDCCH according to an embodiment of the present invention.

As illustrated in FIG. 5, a base station transmits a HARQ swap indicator, a carrier selection bit and a HARQ process ID (Identifier) to a mobile station through a PDCCH. An order of a HARQ swap indicator, a carrier selection bit and a HARQ process ID can be changed.

A carrier selection bit selects a carrier among predetermined carriers in retransmission with HARQ swap, and can be used as other purpose in initial transmission or retransmission without HARQ swap.

A HARQ process ID maintains previous PID (Process Identifier). HARQ process ID can be signaled explicitly or inferred implicitly by a mobile station.

A case that the HARQ process ID is inferred implicitly by a mobile station will be described. In a LTE system, a base station assigns and transmits redundancy version (RV) in sequence of 0, 2, 3, 1, 0, 2, 3, 1, . . . in initial transmission and retransmission. Thus, if a base station inform a mobile station whether transmission is initial transmission of retransmission with a new data indicator (NDI), a mobile station can infer the HARQ process ID implicitly.

In case that a base station performs HARQ swap without a HARQ swap indicator, control information transmitted through a PDCCH can be masked or scrambled to indicate that HARQ swap occurred.

Also, when performing HARQ swap, a base station transmits control information using a specific PDCCH format for HARQ swap. Then, a mobile station can know whether HARQ swap occurred or not as blind decoding. Compatibility with a LTE system is guaranteed and a separate service is provided in a LTE-A system.

Also, a base station can inform a mobile station whether HARQ swap occur or not using a specific downlink control information (DCI).

A mobile station restores transport blocks by combining data received initial transmission and data received in retransmission, and transmits ACK to a base station S340. A base station confirms that transport blocks are transmitted successfully by receiving ACK.

Next, a method of transport block retransmission according to an embodiment of the present invention in case that a transport block is transmitted through a component carrier will be described with reference to FIGS. 6 to 9.

In FIGS. 6 to 9, it is assumed that a base station transmits transport blocks 0 through 4 downlink component carriers and the 4 downlink component carriers are linked to one uplink component carrier. Mapping patterns of component carriers and transport blocks are predetermined according to a retransmission number. FIGS. 6 to 9 represent a case that a pattern generated by cyclic-shifting a mapping pattern used in initial transmission to the left by one component carrier number is used in retransmission. And, a mobile station transmits one ACK for downlink component carriers used in transmission. That is, a mobile station transmits ACK if transmission of all of 4 component carriers is successful, and a mobile station transmits NACK if transmission of at least one component carrier fails.

Figure 6:
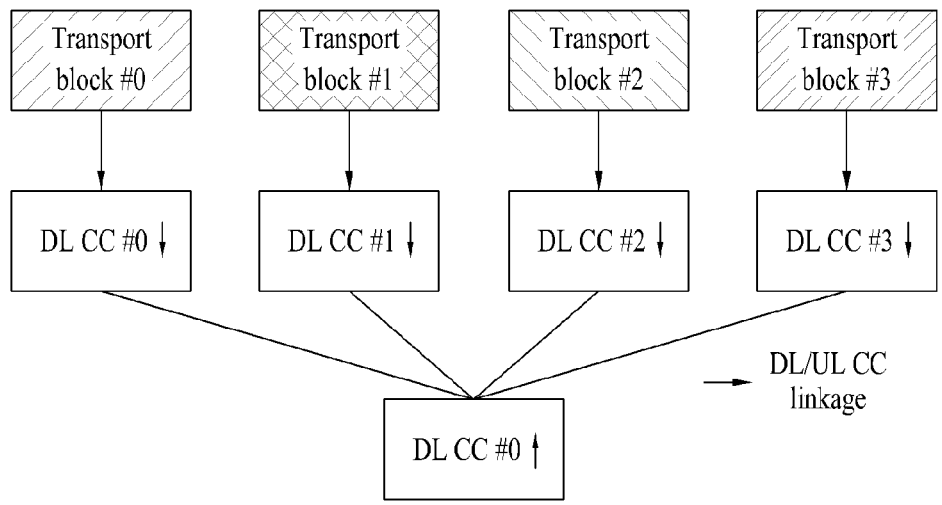
FIG. 6 illustrates initial transmission.

FIG. 6 illustrates initial transmission. As illustrated in FIG. 6, a base station transmits $0^{th}$ transport block through $0^{th}$ component carrier, $1^{st}$ transport block through $1^{st}$ component carrier, $2^{nd}$ transport block through $2^{nd}$ component carrier, and $3^{rd}$ transport block through $3^{rd}$ component carrier in initial transmission.

Figure 7:
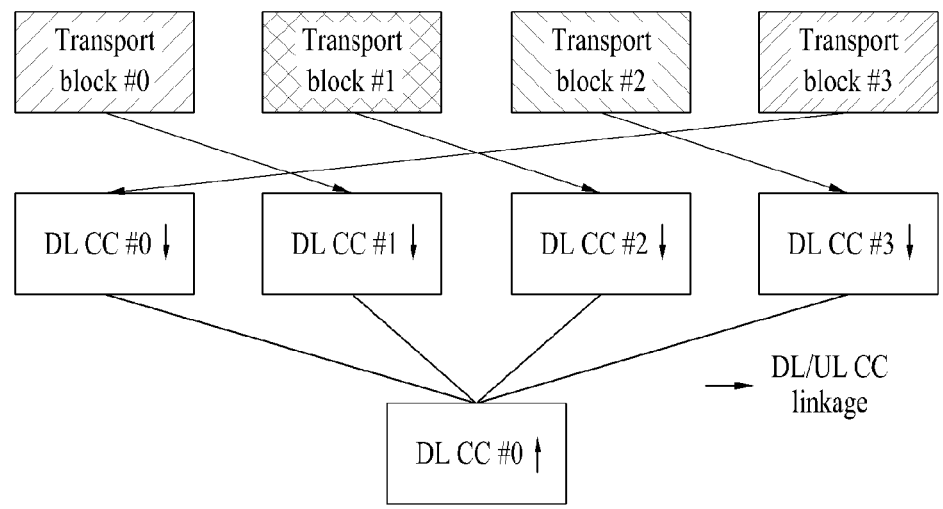
FIG. 7 illustrates first retransmission of transport blocks.

A base station retransmits transport blocks if a base station receives NACK or a timer expires before a base station receives ACK, wherein the timer is started immediately after transmitting transport blocks. Retransmission is performed as FIG. 7 if a HARQ swap indicator is on. FIG. 7 illustrates first retransmission of transport blocks. As illustrated in FIG. 7, a base station transmits $0^{th}$ transport block through $1^{st}$ component carrier, $1^{st}$ transport block through $2^{nd}$ component carrier, $2^{nd}$ transport block through $3^{rd}$ component carrier, and $3^{rd}$ transport block through $0^{th}$ component carrier in first retransmission.

Figure 8:
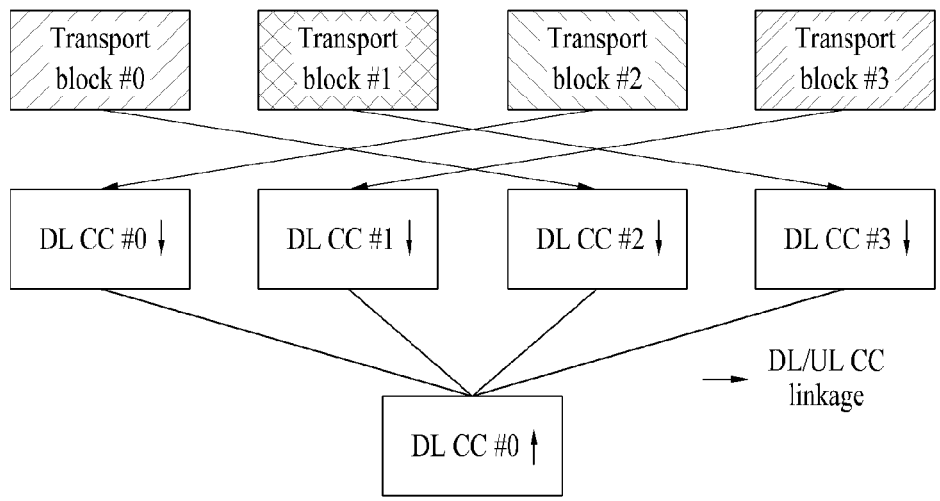

A base station performs second retransmission of transport blocks if a base station receives NACK or a timer expires before a base station receives ACK, wherein the timer is started immediately after first retransmission of transport blocks. FIG. 8 illustrates second retransmission of transport blocks in case that a HARQ swap indicator is on. As illustrated in FIG. 8, a base station transmits $0^{th}$ transport block through $2^{nd}$ component carrier, $1^{st}$ transport block through $3^{rd}$ component carrier, $2^{nd}$ transport block through $0^{th}$ component carrier, and $3^{rd}$ transport block through $1^{st}$ component carrier in second retransmission.

Figure 9:
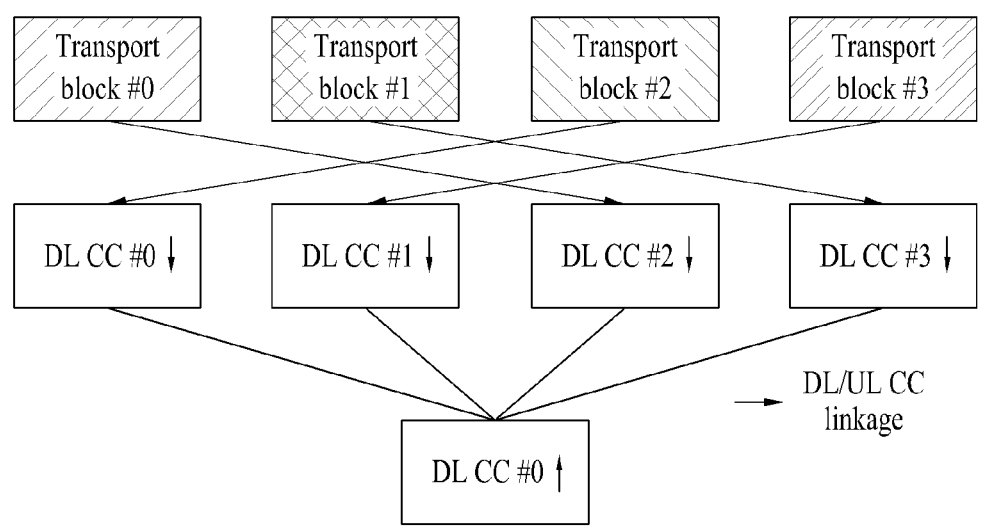
FIG. 9 illustrates third retransmission of transport blocks in case that a HARQ swap indicator is off.

After second retransmission, a base station retransmits transport blocks if a base station receives NACK or a timer expires before a base station receives ACK, wherein the timer is started immediately after second retransmission of transport blocks. FIG. 9 illustrates third retransmission of transport blocks in case that a HARQ swap indicator is off. As illustrated in FIG. 9, a base station performs third retransmission with same a mapping pattern as a mapping pattern used in second retransmission.

Next, a method of transport block retransmission according to an embodiment of the present invention in case that a plurality of transport blocks is transmitted through a component carrier will be described with reference to FIGS. 10 to 12.

Figure 10:
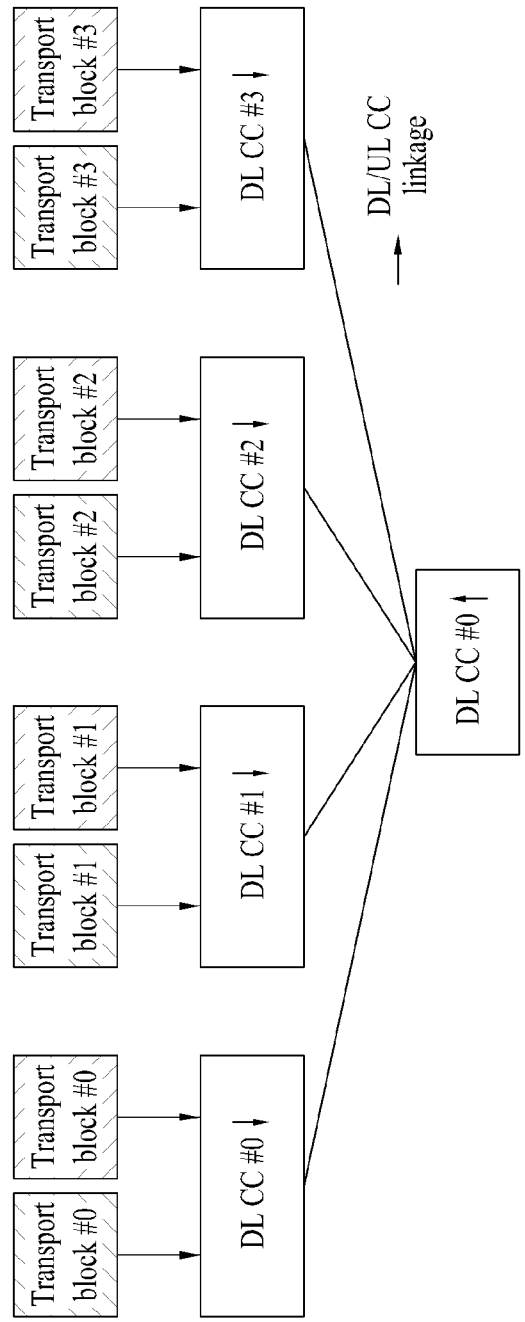
FIG. 10 illustrates initial transmission of a case that two transport blocks are transmitted through a component carrier.
Figure 11:
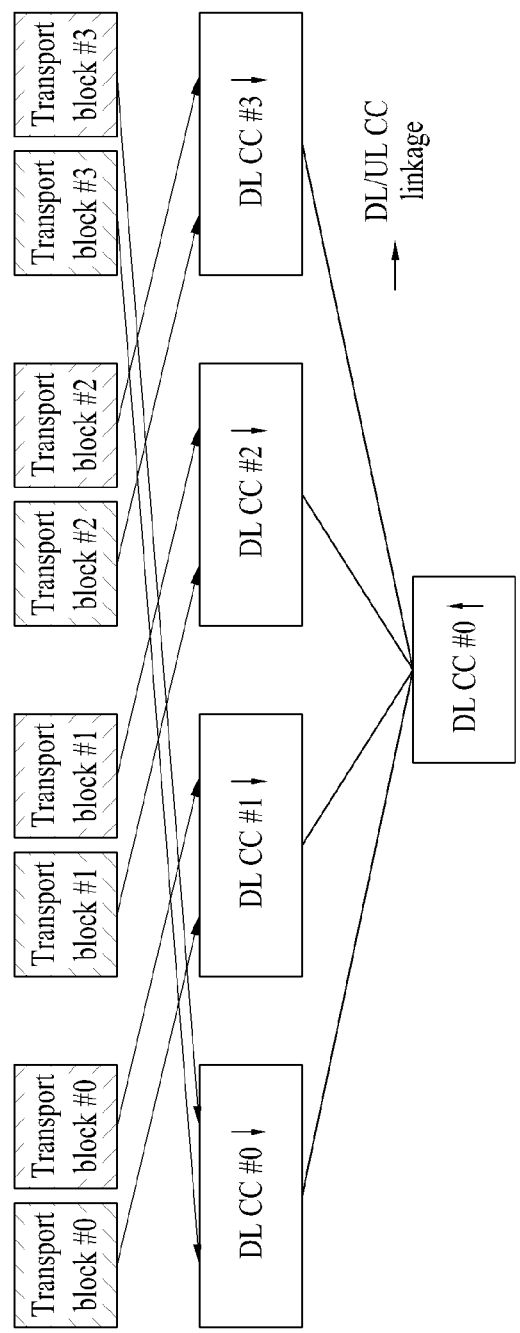
FIG. 11 illustrates retransmission of a case that a mapping pattern of layers and a plurality of transport blocks transmitted through each component carrier is not changed, and a mapping pattern of a plurality of transport blocks and component carriers is changed.
Figure 12:
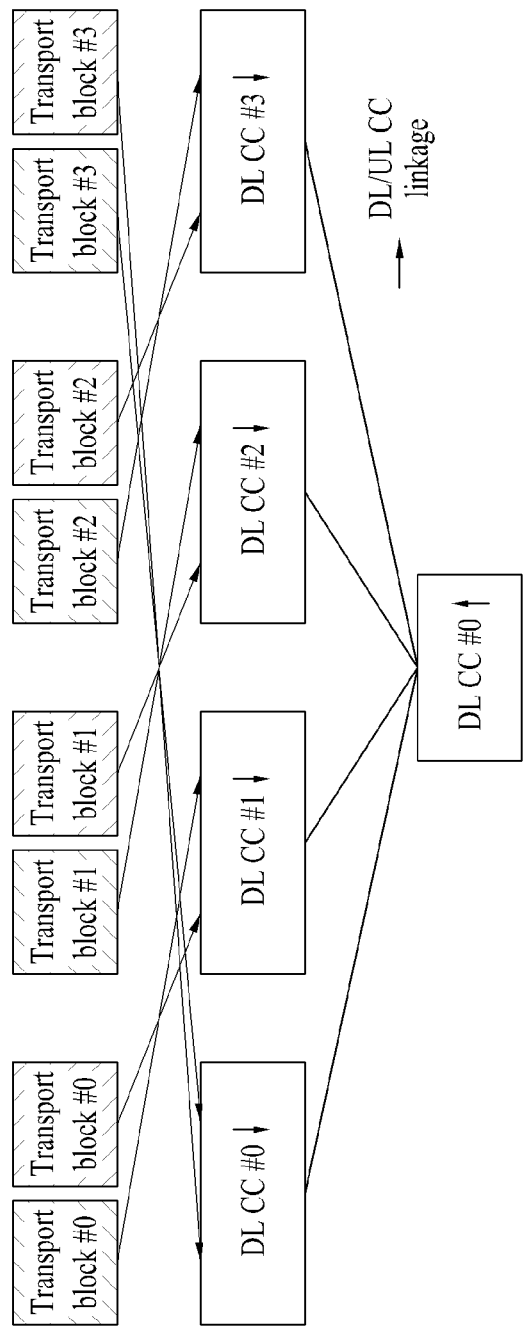
FIG. 12 illustrates retransmission of a case that a mapping pattern of layers and a plurality of transport blocks transmitted through each component carrier and a mapping pattern of a plurality of transport blocks and component carriers are changed.

In FIGS. 10 to 12, it is assumed that a transport block is mapped to a codeword and each codeword is mapped to each layer.

It is possible that a mapping pattern of layers and a plurality of transport blocks transmitted through each component carrier is not changed, and a mapping pattern of a plurality of transport blocks and component carriers is changed in retransmission. Also, It is possible that a mapping pattern of layers and a plurality of transport blocks transmitted through each component carrier and a mapping pattern of a plurality of transport blocks and component carriers are changed in retransmission.

FIGS. 10 to 12 represent a case that two transport blocks are transmitted through a component carrier. FIG. 10 illustrates initial transmission of a case that two transport blocks are transmitted through a component carrier. FIG. 11 illustrates retransmission of a case that a mapping pattern of layers and a plurality of transport blocks transmitted through each component carrier is not changed, and a mapping pattern of a plurality of transport blocks and component carriers is changed. FIG. 12 illustrates retransmission of a case that a mapping pattern of layers and a plurality of transport blocks transmitted through each component carrier and a mapping pattern of a plurality of transport blocks and component carriers are changed.

As illustrated in FIG. 10, a base station transmits two $0^{th}$ transport block through $0^{th}$ component carrier, two $1^{st}$ transport block through $1^{st}$ component carrier, two $2^{nd}$ transport block through $2^{nd}$ component carrier, and two $3^{rd}$ transport block through $3^{rd}$ component carrier in initial transmission.

A base station retransmits transport blocks if a base station receives NACK or a timer expires before a base station receives ACK, wherein the timer is started immediately after transmitting transport blocks. In case that a mapping pattern of layers and a plurality of transport blocks transmitted through each component carrier is not changed, and a mapping pattern of a plurality of transport blocks and component carriers is changed, retransmission is performed as FIG. 11 if a HARQ swap indicator is on. In FIG. 11, a mapping pattern of layers and a plurality of transport blocks transmitted through each component carrier is not changed and a mapping pattern of a plurality of transport blocks and component carriers is changed.

In case that a mapping pattern of layers and a plurality of transport blocks transmitted through each component carrier and a mapping pattern of a plurality of transport blocks and component carriers are changed in retransmission, retransmission is performed as FIG. 12 if a HARQ swap indicator is on. In FIG. 12, a mapping pattern of layers and a plurality of transport blocks transmitted through each component carrier and a mapping pattern of a plurality of transport blocks and component carriers are changed.

Next, an example of operation of coding chain and decoding chain according to an embodiment of the present invention will be described with reference to FIGS. 13 and 14.

Figure 13:
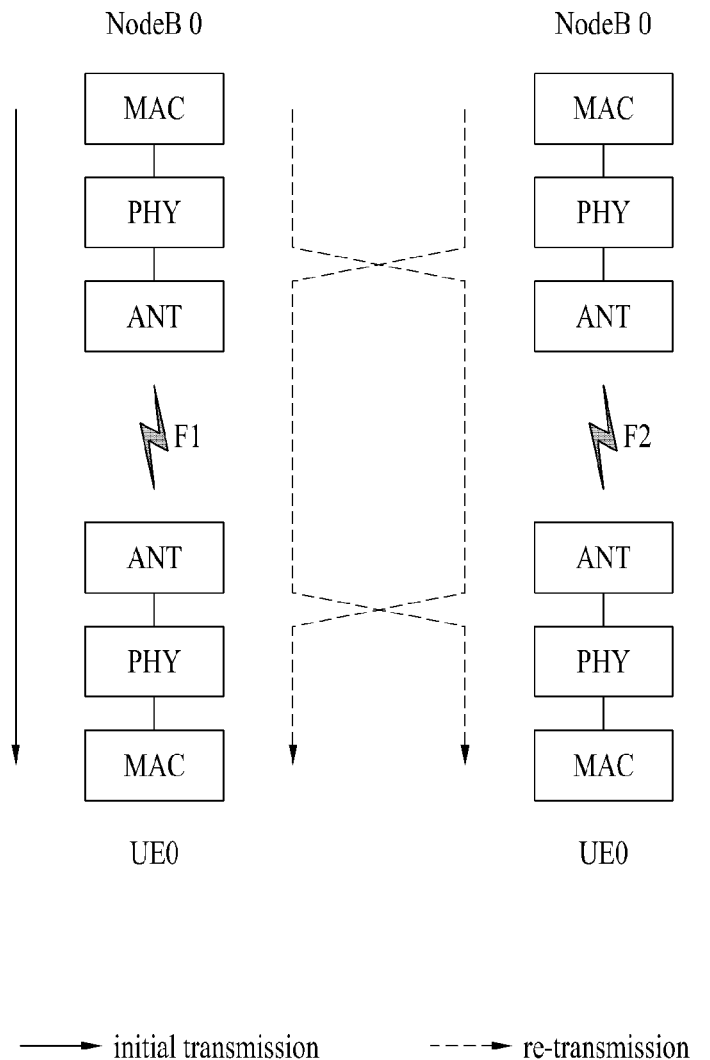
FIG. 13 illustrates an example of operation of coding chain and decoding chain according to an embodiment of the present invention.

FIG. 13 illustrates an example of operation of coding chain and decoding chain according to an embodiment of the present invention. FIG. 13 shows a case that two component carriers are used in data transmission. In case that three or more component carriers are used in data transmission, a number of coding chains and decoding chains increase as many as a number of component carriers.

In FIG. 13, left sides represent coding chain and decoding chain of data which is transmitted through F1, and right sides represent coding chain and decoding chain of data which is transmitted through F2. A solid line represents process direction of initially transmitted data, and a dotted line represents process direction of retransmitted data.

In FIG. 13, a transport block transmitted through F1 in initial transmission is transmitted through F2 in retransmission, and a transport block transmitted through F2 in initial transmission is transmitted through F1 in retransmission.

A transport block transmitted through F1 in initial transmission uses coding chain and decoding chain of F1 in initial transmission. And a transport block transmitted through F1 in initial transmission uses MAC (Medium Access Control) and physical coding chain of F1 and process after physical coding chain of F2 in retransmission. Thus, before loaded in an antenna, coded data need to be swapped between a physical layer and an antenna.

For example, in 3GPP R8, coding and decoding chain can be configured using codeword to layer mapping. Swapping or switching function of coding chain need to have compatibility with swapping or switching function of decoding chain. A mobile station must be able to find out a HARQ process ID and put it in a HARQ buffer before decoding data received through an antenna in a physical layer.

FIG. 14 illustrates another example of operation of coding chain and decoding chain according to an embodiment of the present invention. FIG. 14 shows a case that two component carriers are used in data transmission. In case that three or more component carriers are used in data transmission, a number of coding chains and decoding chains increase as many as a number of component carriers.

In FIG. 14, left sides represent coding chain and decoding chain of data which is transmitted through F1, and right sides represent coding chain and decoding chain of data which is transmitted through F2. A solid line represents process direction of initially transmitted data, and a dotted line represents process direction of retransmitted data.

In FIG. 14, a transport block transmitted through F1 in initial transmission is transmitted through F2 in retransmission, and a transport block transmitted through F2 in initial transmission is transmitted through F1 in retransmission.

A transport block transmitted through F1 in initial transmission uses coding chain and decoding chain of F1 in initial transmission. And a transport block transmitted through F1 in initial transmission uses MAC and physical coding chain of F1 and process after physical coding chain of F2 in retransmission.

Thus, a transport block needs to be swapped between a MAC layer and a physical layer. A mobile station must be able to find out a HARQ process ID and put it in a HARQ buffer before decoding data received through an antenna in a physical layer. For example, in 3GPP R8, coding and decoding chain can be configured using reverse concept of codeword to layer mapping. Swapping or switching function of coding chain need to have compatibility with swapping or switching function of decoding chain.

Next, a method of HARQ acknowledgement transmission according to an embodiment of the present invention will be described. HARQ acknowledgement can be transmitted through an uplink control channel or an uplink data channel.

First, a case that HARQ acknowledgement is transmitted through an uplink control channel will be described with reference to FIG. 15.

FIG. 15 illustrates configuration of an uplink control channel including HARQ acknowledgement according to an embodiment of the present invention.

As illustrated in FIG. 15, an uplink control channel according to an embodiment of the present invention includes an indicator and a plurality of HARQ acknowledgements.

Since an uplink control channel according to related art includes CQI/PMI, RI, ACK/NACK and so on, quality of data transmitted through the uplink control channel is depreciated if a plurality of HARQ acknowledgements are transmitted through the uplink control channel.

Thus, an uplink control channel according to an embodiment of the present invention includes only an indicator and a plurality of HARQ acknowledgements. An indicator indicates that an uplink control channel carries only a plurality of HARQ acknowledgements.

That is, while an uplink control channel according to related art carries CQI/PMI, RI and HARQ acknowledgements, an uplink control channel carrying only an indicator and a plurality of HARQ acknowledgements can be used in an embodiment of the present invention. An indicator can be 1 bit or several bits.

Or, an uplink control channel according to an embodiment of the present invention includes only a plurality of HARQ acknowledgements. At this time, an uplink control channel can be masked or scrambled with a specific sequence which represents that the uplink control channel includes only the plurality of HARQ acknowledgements.

Or, a PUCCH format can be predefined, wherein the PUCCH format is used when an uplink control channel carries only HARQ acknowledgements. At this time, HARQ acknowledgements can be expressed individually for each of a plurality of HARQ acknowledgements as a bitmap. Or a plurality of HARQ acknowledgements can be encoded according to an amount of uplink control information. Each HARQ acknowledgement can be configured as a unit of a codeword, a transport block or a carrier.

And, in case that a PUCCH format according to related art is used, HARQ acknowledgements can be expressed individually for each of a plurality of HARQ acknowledgements as a bitmap or can be encoded according to an amount of uplink control information. Or HARQ acknowledgements can be masked or scrambled with a specific sequence which represents that an uplink control channel carries only the plurality of HARQ acknowledgements. Each HARQ acknowledgements can be configured as a unit of a codeword, a transport block or a carrier. Thus, use of a separate PUCCH format, masking or scrambling do not affect legacy mobile stations.

Next, a case that HARQ acknowledgement is transmitted through an uplink data channel will be described with reference to FIGS. 16 to 18.

FIG. 16 illustrates configuration of an uplink data channel in case that HARQ acknowledgement is transmitted through an uplink data channel. Data and HARQ acknowledgements are multiplexed. HARQ acknowledgements exist in SC-FDMA symbols close to reference symbols (RS) in a time domain and exist distributed in a frequency domain. At this time, HARQ acknowledgements can be in frequency band except frequency used for CQI/PMI so to prevent puncturing CQI/PMI. It is for compatibility with a legacy system. RI does not affect a previous configuration. An example of a method of HARQ acknowledgements transmission in a legacy system is 3GPP TS 36.212 V8.4.0.

Figure 17:
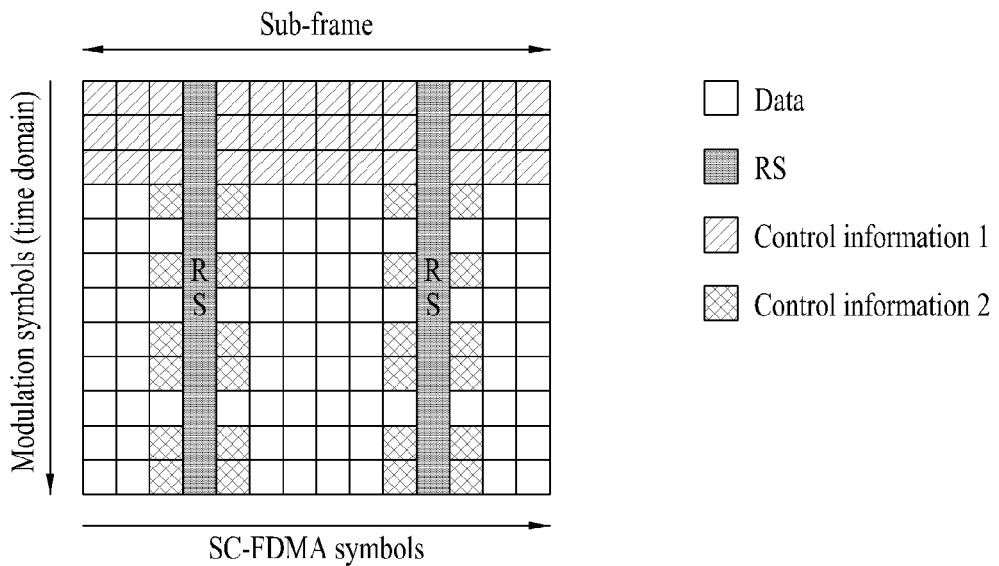
FIG. 17 illustrates configuration of an uplink data channel in detail in case that HARQ acknowledgement is transmitted through an uplink data channel.

FIG. 17 illustrates configuration of an uplink data channel in detail in case that HARQ acknowledgement is transmitted through an uplink data channel.

In FIG. 17, control information 1 represents CQI/PMI, and control information 1 represents HARQ acknowledgements. control information 1 is mapped to resource elements (RE) continuously in SC-FDMA symbols, and HARQ acknowledgements are mapped discontinuously to resource elements of SC-FDMA symbols just beside reference signals. RE is a minimum unit for resource mapping and an area of smallest square of FIG. 17. RI (Rank indication) is mapped to RE apart from RS by 1 RE, and data is mapped to REs in which control information does not exist.

Data is mapped to REs in which control information does not exist wherein the control information uses ratio conformability. Data is mapped from RE next to RE which CQI/PMI are mapped to. That is, CQI/PMI are mapped from left upper position in order. Using ratio conformability means that being mapped to RE without data puncturing.

HARQ acknowledgements are mapped discontinuously to resource elements of SC-FDMA symbols just beside reference signals after data puncturing.

That is, CQI/PMI are mapped to RE without data puncturing, HARQ acknowledgements are mapped to RE after data puncturing, and RI is mapped to assigned resource procured by rate matching for data.

A method of seeking a number and a position of SC-FDMA symbols will be described wherein SC-FDMA symbols are close to RS and can include control information 2.

An area and position of control information 1 are found out by dividing a number of symbols of control information 1 considering modulation order by a number of SC-FDMA symbols. An area and position of control information 2 are found out by dividing a number of symbols of control information 1 and control information 2 considering modulation orders by a number of SC-FDMA symbols.

At this time, amount of control information 2 which a SC-FDMA symbol can includes must be determined considering an amount of control information 1 which the SC-FDMA symbol includes. Also, in case that control information 1, control information 2 and data are multiplexed, an area and position are sought as described above without consideration of control information 2. In case that control information 2 and data are multiplexed, an area and position are sought as described above without consideration of control information 1. Thus, code rate of whole code blocks maintains uniform relatively.

Figure 18:
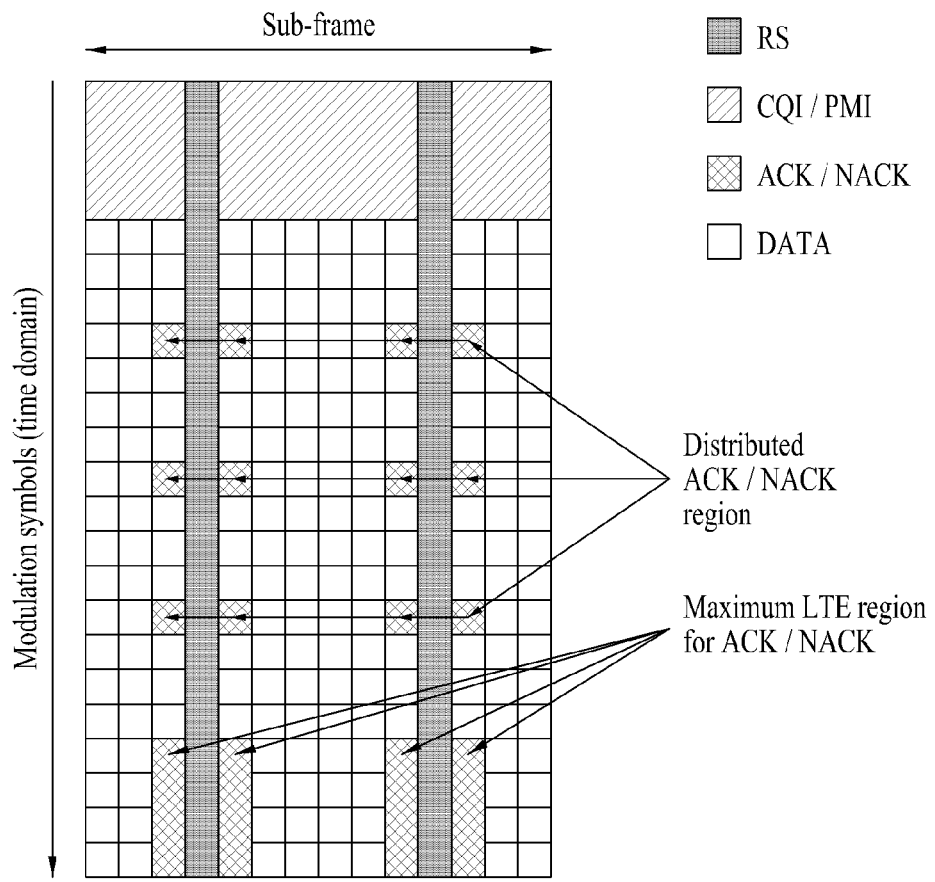
FIG. 18 illustrates a case that a number of HARQ acknowledgements exceeds a maximum number of HARQ acknowledgements which a LTE system can transmits.

FIG. 18 illustrates a case that a number of HARQ acknowledgements exceeds a maximum number of HARQ acknowledgements which a LTE system can transmits. For example, if a number of HARQ acknowledgements exceeds a maximum number of HARQ acknowledgements which a LTE system can transmits and HARQ acknowledgements are not bundled, more REs are used for HARQ acknowledgements transmission than a LTE system.

First, HARQ acknowledgements are mapped to REs which are assigned for HARQ acknowledgements in a LTE system, then HARQ acknowledgements left are mapped discontinuously to REs of SC-FDMA symbols just beside reference signals.

When HARQ acknowledgements are mapped to REs, HARQ acknowledgements are distributed according to ACK/NACK bits of RE. When HARQ acknowledgements are distributed according to ACK/NACK bits, ACK/NACK information can be coded jointly.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, micro-processors, etc.

In a firmware or software configuration, the embodiments of the present invention may be achieved by a module, a procedure, a function, etc. performing the above-described functions or operations. Software code may be stored in a memory unit and driven by a processor. The memory unit may be located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are contained in the scope of the present invention.

It is apparent that the present invention may be embodied by a combination of claims which do not have an explicit cited relation in the appended claims or may include new claims by amendment after application.

The invention claimed is:

1. A method of retransmitting transport blocks in a base station of a wireless communication system employing carrier aggregation, the method comprising:
   mapping each of a plurality of transport blocks to each of a plurality of component carriers using a first mapping pattern;
   transmitting the plurality of transport blocks to a mobile station;
   recognizing whether the plurality of transport blocks are transmitted successfully; and
   mapping each of the plurality of transport blocks to each of the plurality of component carriers using a second mapping pattern and retransmitting the plurality of transport blocks to the mobile station, when the plurality of transport blocks are not transmitted successfully,
   wherein the first mapping pattern is different from the second mapping pattern,
   wherein the retransmitting includes transmitting control information for each of the plurality of transport blocks to the mobile station,
   the control information including a HARQ (hybrid automatic repeat request) swap indicator which indicates that a different mapping pattern from the first mapping pattern is used,
   wherein the control information includes a carrier selection bit indicating which component carrier a specific transmission block is transmitted through, when a number of the plurality of component carriers is greater than 3,
   wherein the control information further includes NDI (new data indicator) for determining, by the mobile station, a HARQ process ID, and
   wherein the second mapping pattern is a pattern generated by cyclic-shifting the first mapping pattern by a specific component carrier number based on a number of retransmission attempts.

2. The method according to claim 1, wherein the step of transmitting includes mapping two or more transport blocks to each of the plurality of component carriers using a third mapping pattern and the step of retransmitting includes mapping the two or more transport blocks to each of the plurality of component carriers using the third mapping pattern.

3. The method according to claim 1, wherein the step of transmitting includes mapping two or more transport blocks to each of the plurality of component carriers using a third mapping pattern and the step of retransmitting includes mapping the two or more transport blocks to each of the plurality of component carriers using a forth mapping pattern.

4. The method according to claim 1, wherein the step of recognizing includes recognizing that the plurality of transport blocks is not transmitted successfully by receiving negative acknowledgement (NACK).

5. The method according to claim 1, wherein the step of recognizing includes recognizing that the plurality of transport blocks is not transmitted successfully by expiring a timer without receiving acknowledgement (ACK), wherein the timer is started immediately after transmitting the plurality of transport blocks.

6. A method of transmitting HARQ (hybrid automatic repeat request) acknowledgement in a receiver of a wireless communication system employing carrier aggregation, the method comprising:
   receiving data transmitted in initial transmission and retransmission, through a plurality of component carriers from a transmitter; and
   transmitting a plurality of HARQ acknowledgements for the data to the transmitter via an uplink control channel,
   wherein mapping patterns for the initial transmission and retransmission are different from each other when a HARQ swap indicator received in retransmission indicates a HARQ swap occurrence,
   wherein the uplink control channel carries only the plurality of HARQ acknowledgements, and
   wherein the uplink control channel includes an indicator indicating that the uplink control channel carries only the plurality of HARQ acknowledgements.

* * * * *